United States Patent [19]

Morales-Garza et al.

[11] Patent Number: 4,755,871

[45] Date of Patent: Jul. 5, 1988

[54] CONTROL OF RF ANSWER PULSES IN A TV ANSWER BACK SYSTEM

[75] Inventors: Fernando Morales-Garza; Oscar Morales-Garza; Jorge E. Ortiz-Salinas, all of Garza Garcia N.L., Mexico

[73] Assignee: Magus, Ltd., George Town, British West Indies

[21] Appl. No.: 934,866

[22] Filed: Nov. 25, 1986

[51] Int. Cl.$^4$ .............................................. H04H 9/00
[52] U.S. Cl. ..................................... 358/84; 331/1 A; 455/75
[58] Field of Search ................... 358/84, 86; 455/2, 4, 455/5, 92, 265, 75, 76; 331/1 A

[56] References Cited

U.S. PATENT DOCUMENTS

| | | | |
|---|---|---|---|
| 3,997,718 | 12/1976 | Ricketts et al. | 358/84 |
| 4,025,851 | 3/1977 | Haselwood et al. | 455/2 |
| 4,450,518 | 5/1984 | Klee | 331/1 A X |
| 4,494,111 | 1/1985 | Rocci et al. | 358/86 X |
| 4,520,508 | 5/1985 | Reichert, Jr. | 358/86 X |
| 4,591,906 | 5/1986 | Morales-Garza et al. | 358/84 |
| 4,630,108 | 12/1986 | Gomersall | 358/84 |

FOREIGN PATENT DOCUMENTS 103438  3/1984  European Pat. Off. ............. 358/84

*Primary Examiner*—Keith E. George
*Attorney, Agent, or Firm*—Laurence R. Brown

[57] ABSTRACT

In a TV answer back system where many receiver stations communicate with a TV transmitter station by means of rf pulses generated by rf oscillators at the receiver station, the requirement for keeping all oscillators on frequency is achieved without crystal temperature control by automatically controlling the rf oscillator frequency using synchronization signals carried in the video signal received from the TV studio. By this invention it has been possible to control the frequency of multiple megahertz oscillator as accurately as desired from relatively low frequency synchronizing signals such as the vertical and horizontal video sync pulses. Thus an oscillations counter is gated for a very accurate time period by the sync pulses, and the oscillation count is compared with a datum count representing the desired oscillation frequency. The requirement to prevent receiver stations from answering with rf pulses in response to queries contained in home video recordings of previously broadcast signals is achieved by encoding broadcast time on all query containing TV transmissions, and by comparing at receiver stations broadcast time information from received signal with time from a local battery backed clock contained at each receiver station, thus discrimination of video recordings is possible by comparing received video broadcast time with local time.

15 Claims, 5 Drawing Sheets

CONTROL OF RF ANSWER PULSES IN A TV ANSWER BACK SYSTEM

TECHNICAL FIELD

This invention relates to TV answer back systems wherein rf answer pulses are transmitted from receiver locations to TV studios in response to queries sent from TV studios on the TV signal, and more particularly it relates to the control of the carrier frequency at which the rf pulses are generated at the receiver locations, and to the control and prevention of false answer pulses from being transmitted from receiver locations in response to queries received from a playback of a video recording of a broadcast TV signal.

BACKGROUND ART

In the TV answer back system of our U.S. Pat. No. 4,591,906 May 27, 1986 for Wireless Transmission from the Television Set to the Television Station, rf beep answers are transmitted by wireless transmission from receiver stations at very high frequenceis such as 53 megahertz or higher. In this system all receivers are operating on the same answer back frequency. It is imperative then that all the receivers have very carefully controlled answer back frequency to provide a very narrow bandwidth necessary for the communication channel, and to assure that all answers are received and processed at the TV studio. One means of control is to provide a temperature compensated oven for crystal controlled oscillators at each receiver station. However, for many thousand stations in the range of a single TV transmitter, this is an expensive and unreliable undertaking as shocks, aging, and other factors that affect oscillation frequency can not be controlled in a home environment.

Also, in a given geographical area, several TV signals from TV stations and cable channels may request answers simultaneously, and receiver stations with capability to answer back in two or more frequenceis may be desirable. Accordingly it is an objective of this invention to provide inexpensive and accurate control of oscillators located at receiver stations, in systems with single or multiple answer back frequencies.

The foregoing objective raises a serious problem, namely that a very high multiple megahertz oscillation frequency need be accurately frequency controlled without crystals in a home environment where temperatures, voltages and other operational conditions vary significantly, thereby tending to vary the oscillator frequency.

It is also desirable to have a frequency control system compatible with the technology used in the answer back equipment in order to further reduce cost. Thus, the use of pulse counting microprocessor technology is preferred. This then rises a problem that heretofore has not been resolved, namely it does not seem possible to control the megahertz oscillator frequency accurately within very few parts per million without having local means to control the environment (as in oven crystals), or to compensate for changes in ambient conditions (temperature compensation), or to adjust for changes due to aging (manual screw adjustments).

In a TV answer back system where TV stations encode query signals into the video signal, receiver stations send rf answer pulses in response to queries contained in the video signal, however, receiver stations will also send rf answer pulses in response to a video signal coming from a home video recorder when this signal was orginaly recorded from a TV broadcast containing encoded queries. This then raises a problem that heretofore has not been resolved, namely it does not seem possible to discriminate from a live TV signal containing queries and from a home video recording fo a TV signal containing queries, and thus prevent receiver stations from sending rf answer pulses that may interfere with answers from live broadcast queries.

DISCLOSURE OF THE INVENTION

This invention provides an automatic frequency control circuit capable of keeping a large number of multiple megahertz transmitting oscillators at receiver stations in a TV answer back system accurately on frequency within very close tolerances by synchronization with very low frequency vertical and horizontal sync pulses accurately timed and controlled at TV transmitter station and received and processed in the same microprocessor equipment at the receiver station used to process the timing of transmission of answer back pulses.

To control the oscillator output with accuracies of a few parts per million, the oscillator output is monitored by a counter that counts oscillations over a precisely timed interval related to the accuracy of the studio generated vertical and horizontal signals. Thus for a count interval of one second or a fraction of a second, the number of oscillator cycles can be compared with a datum count of the exact expected count when on frequency and differences are used to generate a corresponding correction signal in an automatic frequency control circuit.

The timing control accuracy is obtained in part by counting vertical and horizontal sync pulses transmitted from the TV transmitter studio to set a time period for gating count time for the oscillator output, but more importantly by accurately timing the beginning and ending time of the counting period precisely at the occurrence of the leading edge of the horizontal sync pulse.

Even further protection in the answer back system is provided by switching circuits preventing any transmission from the receiver station unless the oscillator is on frequency. Thus without a local crystal oscillator and without any substantial extra equipment at the receiver station, the back transmission band is kept very narrow to within a few parts per million of the accurate studio source of vertical and horizontal signals.

Also, by using the existing digital encoding capabilities at the transmitter site, and the data bit reception capabilities already existing at receiver locations, the datum count or the desired answer back frequency from which the datum count can be derived, can be sent from the transmitter site to the receiver station. Thus, the answer back frequency can be set and varied at will from the transmitter site. This is very important, as frequency availability may vary from one location to another or may change with time, and different answer back frequencies may be desired for each transmitter station.

In a TV answer back system where queries are encoded and thus become part of the video signal, it is very important that the equipment at receiving stations can discriminate a true live broadcast from a home recording of a live broadcast, as both program contents may contain query signals ordering receiving stations to transmit answer back pulses to the transmitter site, it is thus important to prevent stations from responding to home recorded signals, as this may interfere with answers from true live query signals. This is even more important when the answer back frequency is controled by the timing of vertical and horizontal sync pulses that when coming from a home video recorder may produce not only false timing of answer pulses, but an answer back carrier frequency under control of an unstable home video recorder.

The solution to this problem is to have transmitter TV stations with query encoding capability encode the real time (i.e. year, date, hours, minutes and seconds) of broadcast on all TV signals containing queries and to have receiver stations compare this broadcast time with time information from a local battery backed clock source at each receiver station, if the difference between these two times is zero or less than a few seconds, the video source will be assumed to be live and the battery backed clock will be updated, thus keeping receiver clock always in close synchrony with the clock at the transmission site, also the time of the last clock update will be stored in non volatile memory, if the difference is more than a few seconds then this difference will be divided by the time elapsed between the last clock update and the current local clock time, thus computing an error rate, if this error rate is less than the expected error rate of the receiver clock, i.e. 100 parts per million, then the source will be assumed to be a live broadcast and the clock will be updated, otherwise the source will be assumed to be a home recorded broadcast and the switching circuits to prevent transmission from the receiver station will be activated.

Further features, advantages and details of the invention are set forth in the following description, drawings and claims.

Figure 1:
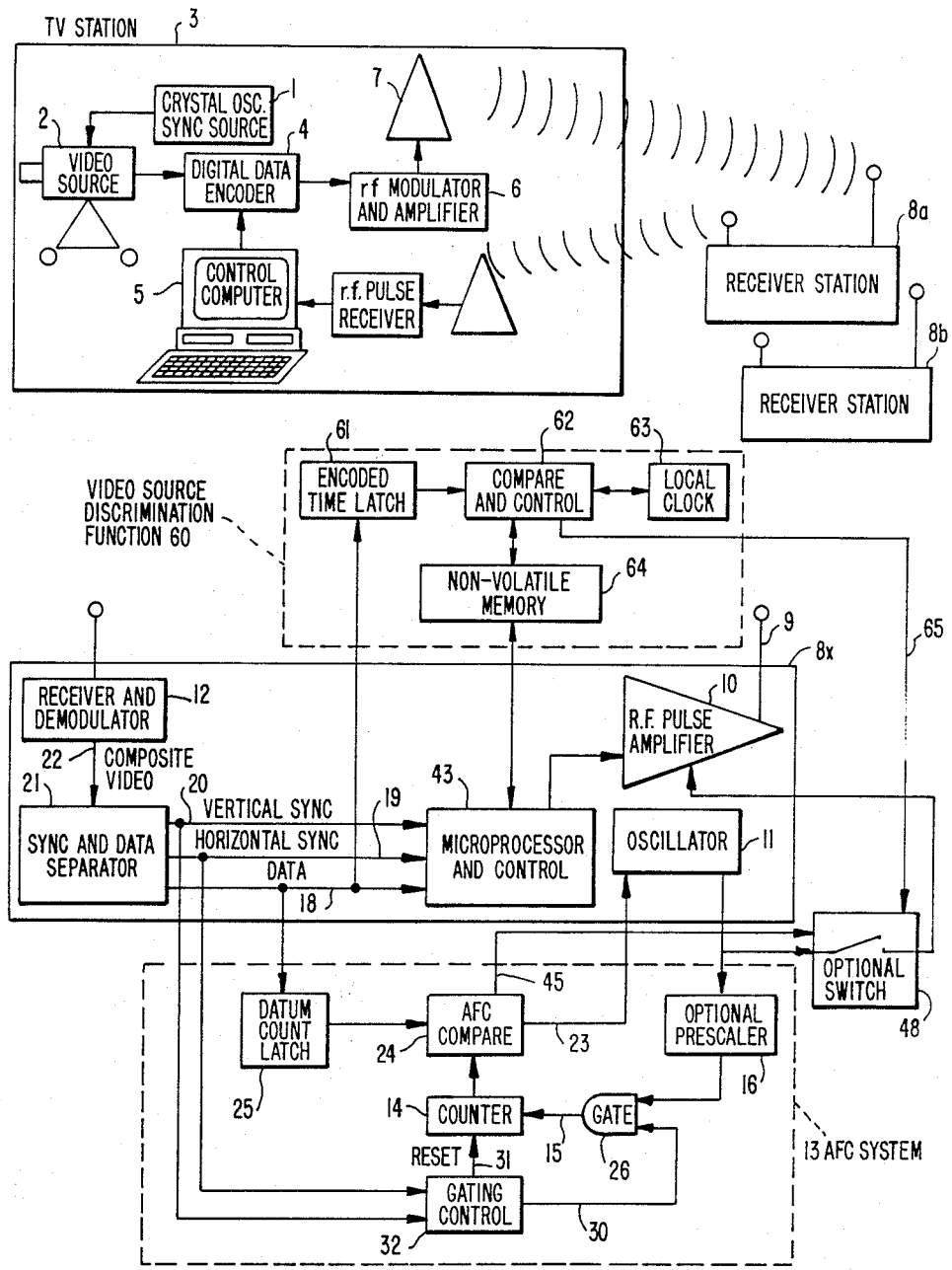
FIG. 1 is a system block diagram of the bidirectional transponding TV system embodying the invention in which an answer back from any one of the many receiving stations is sent to a transmitter studio on an rf beep transmission of a precise carrier frequency. One of the receiver stations is shown with a functional diagram of the automatic frequency control means afforded by this invention for the oscillator generating the carrier frequency of answer beeps, and with a functional diagram of the video source discrimination system to prevent false answer beeps from being transmitted in response to video recordings of query encoded broadcasts.

DETAILED DESCRIPTION OF THE PREFERRED EMBODIMENT:

The TV answer back system embodying this invention has a TV station 3 with a video source 2 having a carefully controlled oven temperature for crystal sync source 1, the signal generated by the video source is encoded with digital queries and other digital information by digital data encoder 4 which is under control of control computer 5, the video signal modified by digital data encoder is then rf modulated and amplified by 6 and transmitted on antenna 7 to a plurality of receiver stations 8a, 8b, . . . 8x, etc. As set forth in our patent query signals may be transmitted from TV station 3 and answer signals sent back from the individual receiver stations, 8a, . . . etc. in the form of rf pulses. All the rf pulses are at the same frequency to produce response from all the receiver stations within a narrow band, typically at a VHF carrier frequency of 53 to 220 megahertz. Each receiver station is identified by a particular time of transmission of an rf pulse located accurately along one of the horizontal lines of a video frame.

Thus the receiver station 8x has a local oscillator 11 and an rf pulse amplifier 10 for transmitting on antenna 9, and a receiving antenna with a receiver and demodulator 12 that generate a composite video signal 22 which is decomposed by sync and data separator 21 into vertical sync signal 20, horizontal sync signal 19, and decoded data signal 18. Microprocessor and control circuit 43 processes digital queries from the TV station contained in data signal 18, and formulates and times the transmission of response rf pulses with carrier frequency from oscillator 11.

In accordance with this invention, equipment is used for the purpose of controlling the frequency of oscillator 11 within close limits in an automatic frequency control (AFC) system 13 in response to video sync pulses generated at the TV station 3 and received at the receiver station 8x. The AFC system 13 comprises a counter 14 which responds to oscillations from lead 15, representative of oscillations from VHF oscillator 11 as modified by optional prescaler 16 that divides the oscillation frequency of 11 to a lower frequency more adequate for counter 14, output from prescaler 16 is gated at gate 26 by gating time signal 30 to control oscillation count over a carefully controlled sampling time determined at gating control 32 by the video vertical 20 and horizontal sync pulses 19 derived from the received video signal 22. An automatic frequency correction signal 23 is derived by circuit 24 by comparison of the count sample in counter 14 with the desired datum count in datum count latch 25 representative of the exact desired frequency of oscillator 11. The desired datum count may be set at TV station 3 by an operator through control computer 5 and digitally encoded into the TV signal by encoder 4, the transmitted data will be received at receiver station 8x and will be latched by circuit 25 from decoded data signal 18.

Figure 2:
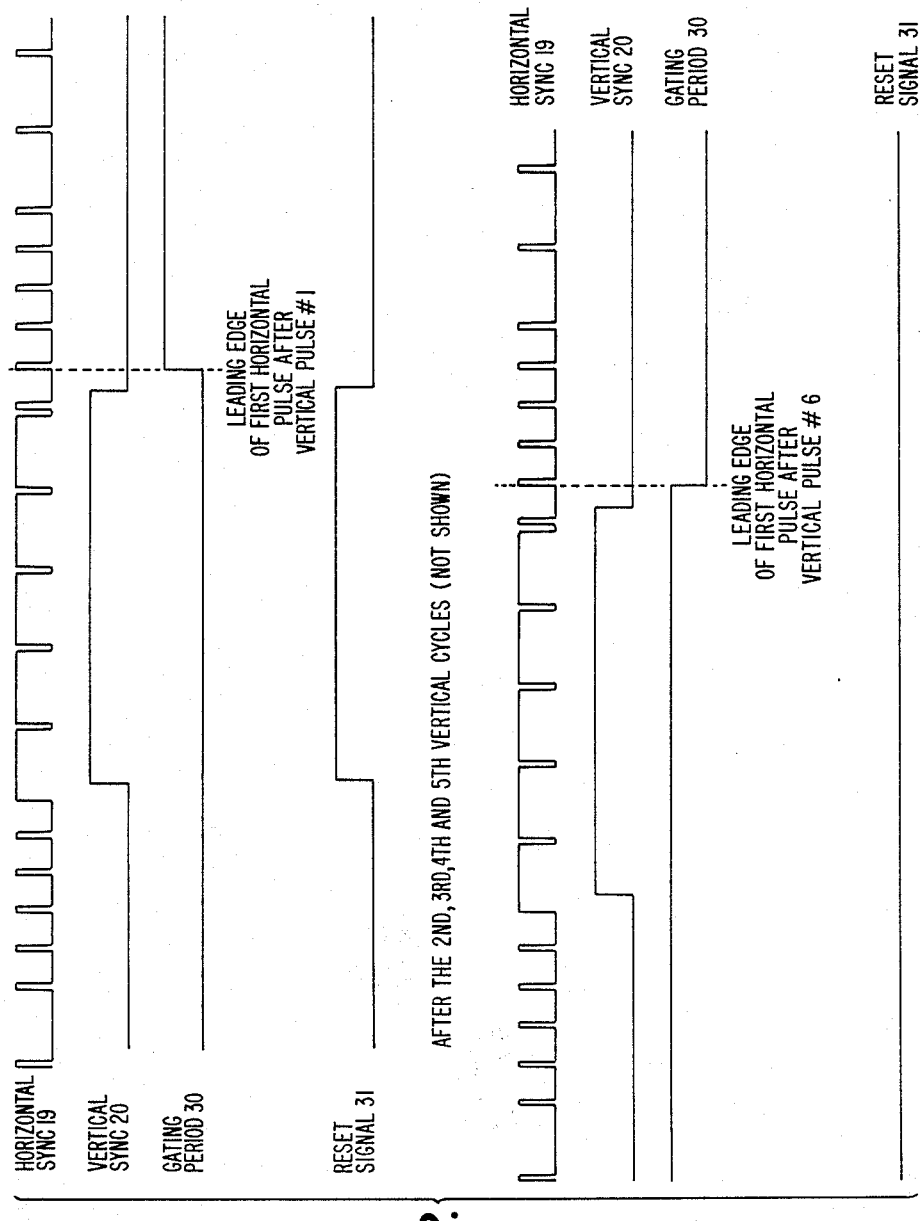
FIG. 2 is a wave form diagram showing the nature of the precise timing signals for the control of the oscillator frequency as afforded by this invention.

It is possible to obtain very good accuracy of the VHF oscillator 11 with the low frequency vertical and horizontal synchronization pulses by means of the and gate 26 in the manner illustrated by the waveforms of FIG. 2. The horizontal and vertical sync pulses in the video signal transmitted from the TV station are carefully timed and controlled by close accuracy, and this timing is used to replace the crystal control circuits at the receiver station. First a reset signal 31 is generated to reset counter 14 to zero, after that, a precisely timed gating period 30 is produced by gating control circuit 32, gating period 30 precisely gates counts of oscillator 11 as modified by optional prescaler (frequency divider) 16. If the resulting count is identical to the datum count 25, the oscillator is on frequency and no correction is necessary in AFC signal 23. If the count is not identical a frequency control signal 23 will be generated, and if the error is too large signal 45 will activate switch 48 to prevent transmission of out of band rf pulses. The gating period is a function of the desired accuracy of the oscillator and of the actual accuracy of the vertical and horizontal sync pulses, as shown on FIG. 2, it may be typically one tenth of a second as determined by a count of six vertical sync pulses by gating control 32, where in response to the leading edge of the first horizontal sync pulse following a vertical pulse the gating period is started and terminated. In this manner the gating period 30 may be accurately repeated and the oscillator frequency may be controlled within very close limits to a desired frequency.

On FIG. 1 receiver station 8x also comprises a video discriminator system 60 for the purpose of discriminating a true live broadcast signal from a home recording of a live broadcast, thus preventing answer pulses from being transmitted in respnse to queries contained in home recordings. Discriminator 60 is comprised of encoded time latch 61 which latches broadcast time information encoded into the video signal by control computer 5 at TV station 3, this time information is received at station 8x and decoded as data signal 18. Time information from 61 is compared at circuit 62 with time from battery backed local clock 63 and a time error is computed, if the error is zero or less than a few seconds, local clock 63 will be updated and the time of this update will be stored in nonvolatile memory 64, if the error is more than a few seconds, the error is divided by the time elapsed between the last clock update contained in memory 64 and the local clock time 63, thus an error rate will be computed, if this error rate is less than the expected error rate of the local clock, i.e. 100 parts per million, then the video source will be assumed to be a live broadcast and the local clock 63 will be updated with time from 61, otherwise the video source will be assumed to be a previously recorded broadcast and the switching circuits 48 will be activated by signal 65 to prevent transmission of answers in response to recorded queries.

Figure 3:
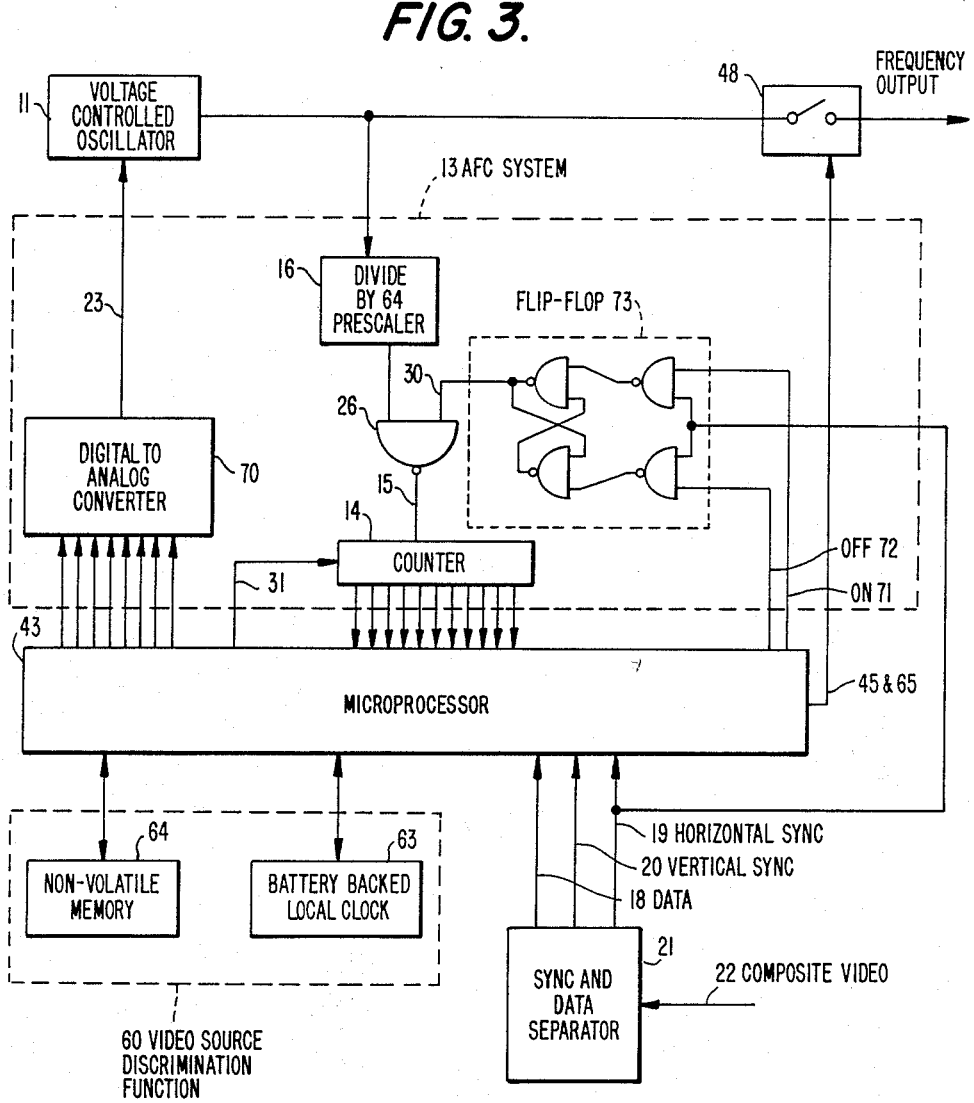
FIG. 3 is circuit block diagram of a microprocessor based implementation of the answer back system at the receiver stations which embody the invention.
Figure 4:
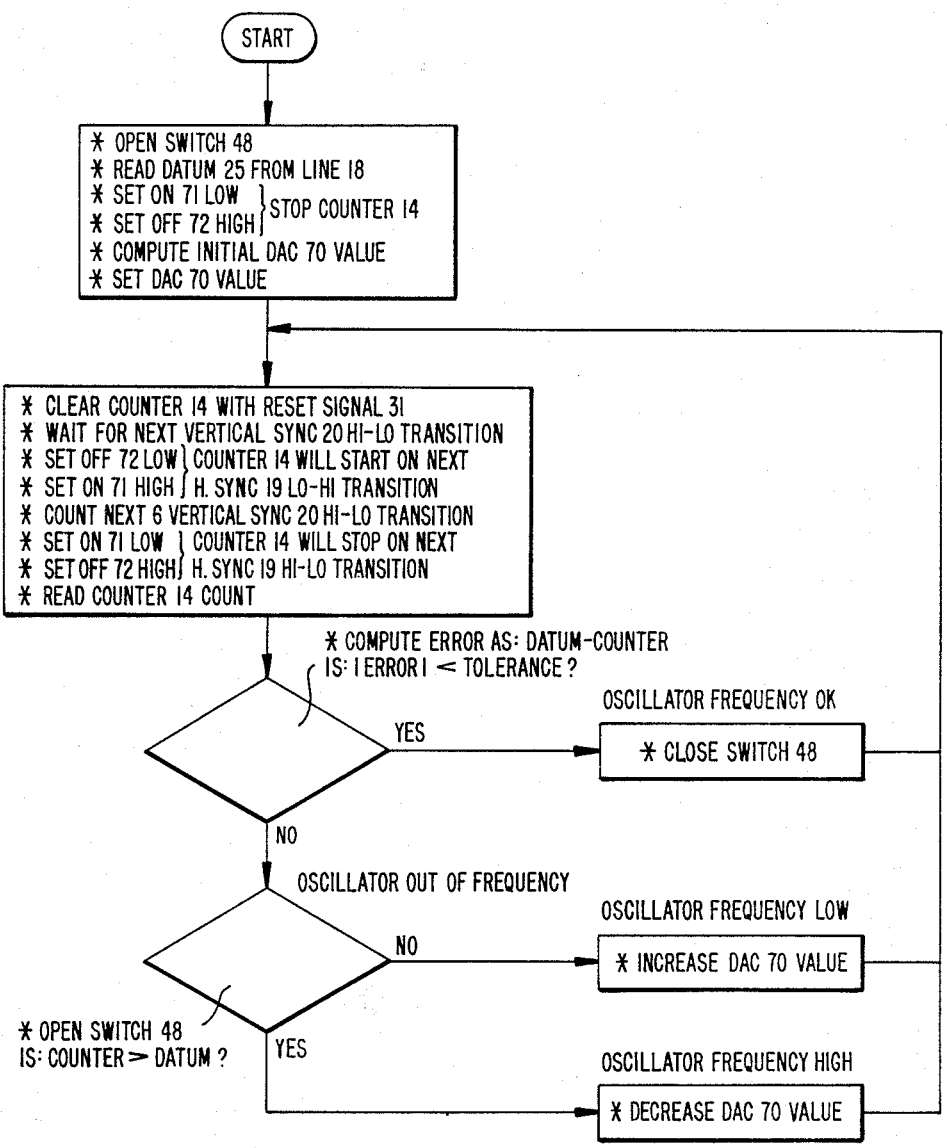
FIG. 4 is a flow diagram of the software implemented on the microprocessor of FIG. 3 for the automatic frequency control afforded by this invention.

FIG. 3 shows a microprocessor based implementation of the previously described functions of this invention, flip-flop 73 is used to precisely generate gating time 30 to start and end at precisely the leading edge (lo-hi transition) of the horizontal sync signal 19, as described by software flow diagram of FIG. 4, ON signal 71 and OFF signal 72 are software driven to start gating time 30 at the first horizontal sync following a vertical sync pulse, and to end gating time 30 at the first horizontal sync six vertical sync pulses later. Reset signal 31 is also software generated to periodically clear counter 14 before a new count cycle begins, datum 25 is read and latched by microprocessor 43 software, and periodically compared with counter 14 count, from this comparison an error is computed that is used to correct the digital input to digital to analog converter (DAC) 70, whose analog output 23 drives voltage controlled oscillator 11.

Figure 5:
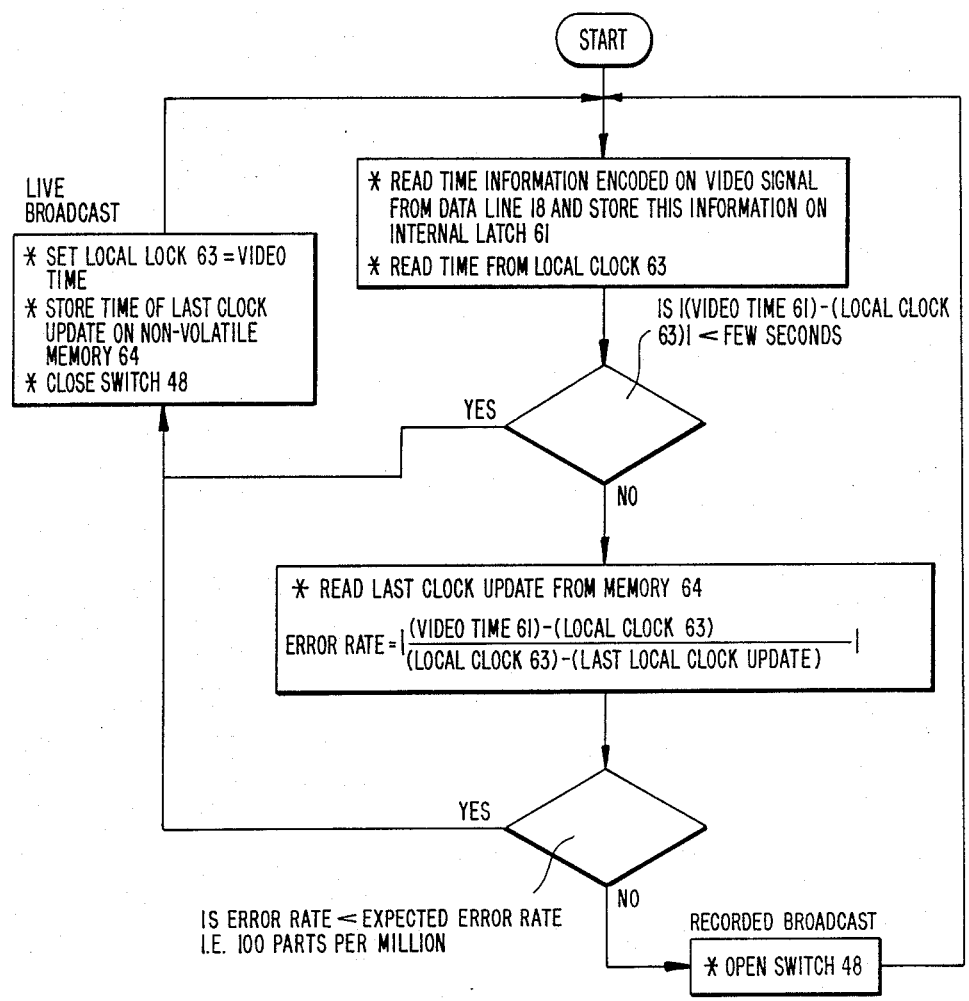
FIG. 5 is a flow diagram of the software implemented on the microprocessor of FIG. 3 for the video source discrimination afforded by this invention.

The software flow diagram of FIG. 5 describes how the video discrimination function 60 is implemented on the microprocessor based implementation of FIG. 3. As previously described, the software will compare if the broadcast time information encoded on the video signal is equal to or within an error rate of the time from the local clock source 63. If this is the case the video source is a live broadcast, switch 48 will be closed to allow transmission of answer pulses, the local clock will be updated and the time of this update will be stored in non-volatile memory 64 for future use in computing clock error rate. Otherwise, the video source is home recorded broadcast and switch 48 will be opened to prevent false answer pulses to be transmitted in response to queries received from a recorded video signal.

In the forgoing manner therefore the bidirectional TV answer back system provides at a multiplicity of receivers precise control of answer back transmission carrier frequency without the necessity for accurate crystal control of the local oscillators, it also prevents answers from being transmitted in response to queries from playbacks of home video recordings that could interfere with true live query broadcasts and could also have out of band carrier frequency as local oscillator would synchronize in response to sync signals from unstable home video recorders. The invention provides a high accuracy of control of very high frequency oscillators unexpectedly with very low low frequency signals that can be handled in conventional microprocessor circuits and thus permits receiver stations to comply with strict frequency variation standards for transmission of rf signals under conditions not as controllable as those in TV transmitting studios. Also, the invention guarantees that receiver stations will only transmit answer back pulses in response to true live broadcasts, an indispensable condition to obtain license permits to operate several thousand transmitters at receiver stations. Thus the state of the art is advanced, and those features of novelty descriptive of the spirit and the nature of the invention are set forth with particularity in the following claims.

We claim:

1. In a bi-directional transmitter-receiver system that transmits information from a receiver site to a transmitter site by way of wireless transmission of an unmodulated pulse of precisely controlled frequency from a radio frequency oscillator, the improvement comprising in combination, a radio frequency oscillator at the receiver for transmitting said pulse and having a controlled oscillation frequency of a predetermined plurality of megahertz and frequency control means to maintain the oscillation frequency at the receiver site within a predetermined accuracy, said means comprising:

means at the transmitter site to generate and transmit to the receiver site synchronizing signals accurately controlled in frequency, gating means at the receiver site to derive from received synchronizing signals an accurately timed gating period, a counter to count oscillations from the oscillator at the receiver site for the time gating period, means to periodically reset the counter and repeat the count, and automatic frequency control means responsive to variations of counts produced by the counter over the counting period from a predetermined datum count representative of a desired oscillator frequency thereby to correct any changes of the oscillator frequency at the receiver site from the desired frequency, whereby accurate frequency control of the oscillator at the receiver site is achieved over variations of voltage, temperature, aging and the like without crystal circuits.

2. A system as defined in claim 1 further comprising signal transmission means coupled to the oscillator at the receiver site to transmit signals from the receiver location, and switching means responsive to said counter to permit transmission of the signal only when the oscillator at the receiver site is at a frequency corresponding to the datum count.

3. A system as defined in claim 1 where the transmitter is a television transmitter further comprising, synchronization means for said gating means operable to count a period between an integral number of vertical sync signals.

4. A system as defined in claim 1 where the transmitter is a television transmitter further comprising, synchronization means for said gating means operable to count a period between an integral number of horizontal sync signals.

5. A system as defined in claim 1 wherein, said datum count is set by signals transmitted from the transmitter site and received at the receiver site, thus permitting variable control of the oscillator frequency at the receiver site from the oscillator at the transmitter site.

6. A television transponder system having a plurality of television receiver stations capable of sending information in response to a viewer's response to a querying televison transmitting studio wich is transmitting queries to receivers on video signals, comprising in combination, transmitters at all said receiver stations having oscillators for transmitting respectively on a single very high transmission frequency of a predetermined number of megahertz unmodulated pulses at precise times for identifying individual receiver stations, and automatic tuning means for said oscillators at the receiver stations keeping the very high oscillator frequency controlled within close limits by means responsive to low frequency synchronization pulses transmitted on the video signals from the transmitting station.

7. The system as defined in claim 6 wherein the oscillators are frequency controlled in the automatic tuning means by frequency control means comprising a periodically time gated counter of the oscillator output frequency, and further frequency control means responsive to variations in count from a datum count achieved when the oscillator output frequency is at its desired frequency.

8. The system of claim 7 wherein the time gated counter is gated between a predetermined number of vertical sync pulses derived from said video signals.

9. The system of claim 7 wherein the time gated counter is gated between a predetermined number of horizontal sync pulses derived from said video signals.

10. The system of claim 7 including switching means for preventing transmissions from the receiver stations when the oscillators thereat are not at the desired frequency.

11. The system of claim 6 further comprising means at the television trnasmitting studio for transmitting information on a desired receiver transmitting frequency and means at receiver stations for receiving such information, and where said oscillator and automatic tuning means at receiver stations are operable at different desired frequencies, thereby allowing receiver stations to send information to different television transmitter studios on different frequencies.

12. A television transponder system having a plurality of television receiver stations capable of sending information to a television transmitting studio which is transmitting video signals, comprising in combination, transmitters at all receiver stations for transmitting respectively on a single very high transmission frequency of a predetermined number of megahertz by means of osillators for respectively transmitting pulses at precise times identifying individual receiver stations, automatic tuning means for said oscillators at the receiver stations keeping the very high oscillator frequency controlled within close limits by means responsive to low frequency synchronization pulses transmitted on the video signals from the transmitting station, and means for distinguishing receiver operation in response to live and recorded signal sources, comprising in combination, means at a television transmitting station for accurately controlling a time signal and transmitting it on a live television signal, means operable to receive said time signal at a television receiving station, and detection means at the receiver station for comparing the received transmitter time signal with a time signal being reproduced at the receiving station to determine when a live broadcast is being received.

13. In a television system having a plurality of television receiver stations operable to reproduce multiple live and recorded television signals from various sources, apparatus for distinguishing receiver operation in response to live and recorded signal sources, comprising in combination, means at a television transmitting station for accurately controlling a time signal and transmitting it on a live television signal, means operable to receive said time signal at a television receiving station, and detection means at the receiver station for comparing the received transmitter time signal with a time signal being produced at the receiving station to determine when a live broadcast is being reproduced.

14. The system of claim 13 further comprising means for encoding query signals into the television signals, means at said television receiver station to receive and process the query signals and produce an answer back signal, and means responsive to the detection means to prevent answer back signals except when live broadcasts are being reproduced.

15. The system of claim 13 wherein the detection means further comprises an automatic time adjustment circuit comprising a battery backed clock circuit at the receiving station providing said time signal, means for comparing the time signal produced at the receiving station from the clock circuit with the time signal transmitted with the television signal to determine time errors of less than a few seconds, means for storing the last compared time signal within said few seconds, and means for updating the time on the clock circuit to correspond with the time of the transmitted time signal in response to the stored time signal.

* * * * *